US010967878B2

(12) United States Patent
Cooke et al.

(10) Patent No.: US 10,967,878 B2
(45) Date of Patent: Apr. 6, 2021

(54) CONTROL SYSTEM FOR A VEHICLE AND METHOD

(71) Applicant: JAGUAR LAND ROVER LIMITED, Coventry (GB)

(72) Inventors: Charlotte Cooke, Haywards Heath (GB); Robert Burford, Winslow (GB); David Armstrong, Birmingham (GB); Christopher Johnson, Hinckley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 63 days.

(21) Appl. No.: 16/065,796

(22) PCT Filed: Dec. 22, 2016

(86) PCT No.: PCT/EP2016/082430
§ 371 (c)(1),
(2) Date: Jun. 23, 2018

(87) PCT Pub. No.: WO2017/109101
PCT Pub. Date: Jun. 29, 2017

(65) Prior Publication Data
US 2018/0370541 A1 Dec. 27, 2018

(30) Foreign Application Priority Data
Dec. 23, 2015 (GB) .................... 1522726

(51) Int. Cl.
*B60W 50/08* (2020.01)
*B60W 50/00* (2006.01)
*B60W 10/00* (2006.01)

(52) U.S. Cl.
CPC ...... *B60W 50/085* (2013.01); *B60W 50/0098* (2013.01); *B60W 2050/0064* (2013.01); *B60W 2050/0066* (2013.01)

(58) Field of Classification Search
None
See application file for complete search history.

(56) References Cited

U.S. PATENT DOCUMENTS 7,349,776 B2  3/2008  Spillane et al.
RE46,828 E    5/2018  Spillane et al.
(Continued)

FOREIGN PATENT DOCUMENTS

DE  102012009429 A1  12/2012
DE  102012011503 A1   6/2013
EP       1914141 A1   4/2008

OTHER PUBLICATIONS

International Search Report for International application No. PCT/EP2016/082430, dated Apr. 12, 2017, 7 pages.
(Continued)

*Primary Examiner* — Redhwan K Mawari
*Assistant Examiner* — Melanie J Patrick
(74) *Attorney, Agent, or Firm* — Reising Ethington P.C.

(57) ABSTRACT

A vehicle control system for controlling at least one subsystem of a vehicle; the vehicle control system comprising: a subsystem controller for initiating control of the or each of the at least one vehicle subsystems in one of a plurality of baseline subsystem control modes by setting at least one control parameter of the or each of the at least one subsystems to a predetermined, stored, value or state applicable to that baseline subsystem control mode, each baseline subsystem control mode corresponding to one or more different driving conditions for the vehicle; and input means for permitting a user to provide an input to the control system, wherein, for at least one of the plurality of baseline subsystem control modes, the control system is configured to allow a user to define, via the input means, a user-configured subsystem control mode based on one said at least one baseline subsystem control mode by adjusting the value or
(Continued)

state of at least one of said at least one control parameters to a value or state other than the predetermined stored value or state applicable to that baseline control mode, the subsystem being configured to cause the subsystem controller to initiate control of the or each of the at least one vehicle subsystems in the user-configured subsystem control mode.

19 Claims, 12 Drawing Sheets

(56) References Cited

U.S. PATENT DOCUMENTS

| | | | |
|---|---|---|---|
| 2005/0004732 A1* | 1/2005 | Berry | B60W 10/06 701/48 |
| 2005/0090963 A1 | 4/2005 | Kuhn et al. | |
| 2005/0140322 A1 | 6/2005 | Itakura | |
| 2011/0022266 A1 | 1/2011 | Ippolito et al. | |
| 2013/0006715 A1* | 1/2013 | Warkentin | G06Q 10/00 705/7.38 |
| 2014/0180557 A1* | 6/2014 | Hunt | G06F 17/00 701/99 |
| 2014/0200789 A1 | 7/2014 | Pietron et al. | |

OTHER PUBLICATIONS

Written Opinion for International application No. PCT/EP2016/082430, dated Apr. 12, 2017, 9 pages.
Combined Search and Examination Report for UK application No. GB1522726.7, dated Jun. 13, 2016, 7 pages.

* cited by examiner

| Column Titles Key (CT1 to CT10) PAGE 12 | | CT1 | CT2 | CT3 | CT4 | CT5 | CT6 | CT7 | CT8 | CT9 | CT10 |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | | | | | | |
| | Open | | | | | X | X | X | X | X | X |
| Steering Assistance | High | SP | SP | SP | SP | SP | SP | SP | SP | | SP |
| | Low | | | | | | | | | | |
| Brake Pedal Efforts | High | X | X | X | | X | X | X | X | X | X |
| | Low | | (X) | X | X | | | | | | |
| A.B.S. Mode | High mu | X | X | X | X | | | | | | |
| | Low mu | | | | | X | X | X | | X | X |
| | Plough Surface | | | | | | | | X | | |
| E.T.C. Mode | High mu | X (2) | X | X | X | | | | | | |
| | Low mu | | | | | X | | X | | X | |
| D.S.C. Mode | High mu | X | X | X | TM | | | | | | |
| | Low mu | | | | | X | X | X | X | X | X |
| Throttle Progression | Quick | | (X) | | (X) | | | | X | | |
| | Slow | X | X | X | X | X | X | X | | X | X |
| Transfer Box | High Range | X | X | X | X | X | X | X | X | X | X |
| | Low Range | | | | | | X | | | | |
| Centre Diff Lock | Open | X | X | X | X | X | X | | X | X | X |
| | Locked | | | | | | | X | | | |
| Rear Diff Lock | Open | X | X | X | X | X | X | X | (X) | X | X |
| | Locked | | | | | | | | | | |

FIGURE 3

SP = Speed Proportional
TM = Towing Mode

Column Titles Key (CT1 to CT10)

| | |
|---|---|
| CT1 | Motorway |
| CT2 | Country Road |
| CT3 | City Driving |
| CT4 | Towing (on Road) |
| CT5 | Dirt Track (Developing World Road) |
| CT6 | Snow / Ice (Scandinavian North American conditions) |
| CT7 | Grass / gravel / snow |
| CT8 | Sand |
| CT9 | Rock / Crawl / Boulder Crossing |
| CT10 | Mud & ruts |

FIGURE 3 continued

CONTROL SYSTEM FOR A VEHICLE AND METHOD

INCORPORATION BY REFERENCE

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

TECHNICAL FIELD

The present disclosure relates to a vehicle controller and control method and particularly, but not exclusively, to a controller and a method for controlling operation of one or more vehicle systems or subsystems in a land-based vehicle capable of driving in a variety of different and extreme terrains and conditions. Aspects of the invention relate to a controller, to a control system, a vehicle, a method, a non-transitory computer readable storage medium carrying a computer readable code, a computer program product executable on a processor, a computer readable medium and a processor.

BACKGROUND

It is known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes.

The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

As noted above, for each of the driving modes each of the sub-systems is set to the function mode most appropriate to those conditions. The present applicant has recognised that the particular configuration of a subsystem in a given driving mode may not be optimum for the actual prevailing conditions, or a driver may have a particular preference for the manner in which one or more of the subsystems are configured in a given driving mode other than the default configuration corresponding to the driving mode. By way of example, it is to be understood that the Sand driving mode may not provide optimum vehicle performance when driving on wet or damp sand, compared with dry sand.

It is against this background that the present invention has been conceived. Embodiments of the invention may provide an apparatus, a method or a vehicle which addresses the above problems. Other aims and advantages of embodiments of the invention will become apparent from the following description, claims and drawings.

SUMMARY OF THE INVENTION

In one aspect of the invention for which protection is sought there is provided a vehicle control system for controlling at least one subsystem of a vehicle; the vehicle control system comprising:
 a subsystem controller for initiating control of the or each of the at least one vehicle subsystems in one of a plurality of baseline subsystem control modes by setting at least one control parameter of the or each of the at least one subsystems to a predetermined, stored, value or state applicable to that baseline subsystem control mode, each baseline subsystem control mode corresponding to one or more different driving conditions for the vehicle; and
 input means for permitting a user to provide an input to the control system, wherein, for at least one of the plurality of baseline subsystem control modes, the control system is configured to allow a user to define, via the input means, a user-configured subsystem control mode based on one said at least one baseline subsystem control mode by adjusting the value or state of at least one of said at least one control parameters to a value or state other than the predetermined stored value or state applicable to that baseline control mode, the subsystem being configured to cause the subsystem controller to initiate control of the or each of the at least one vehicle subsystems in the user-configured subsystem control mode.

Embodiments of the invention have the feature that a user may customise operation of the vehicle by adjusting the value or state of one or more control parameters from the predetermined value or state stored by the control system for at least one baseline subsystem control mode. Thus, if a user determines that vehicle operation in a given baseline subsystem control mode may be improved by adjustment of the value or state of at least one of said at least one control parameters, the user may adjust the value or state and obtain the desired improved operation.

The control system may be configured to allow a user to adjust, via the input means, and in respect of at least one baseline subsystem control mode, the value or state of at least one of said at least one control parameters to customise operation of the vehicle, wherein the allowable range of values or states of said at least one control parameter of the or each at least one subsystem is dependent at least in part on the identity of the baseline subsystem control mode in respect of which the value or state of at least one control parameter is to be adjusted.

It is to be understood that in some embodiments the baseline subsystem control mode in respect of which the value or state of at least one of said at least one control parameters is adjusted via the input means may be the currently selected baseline subsystem control mode, being the baseline subsystem control mode in which the vehicle is configured to operate at the time adjustment is made. Thus, following selection of a baseline subsystem control mode, the user may be permitted to adjust at least one control parameter of that baseline subsystem control mode. In addition or instead, in some embodiments the control system may be configured to allow the user to adjust at least one control parameter of a baseline subsystem control mode even if that control mode is not the currently selected control mode in which the vehicle is configured to operate.

The control system may be configured to allow a user to adjust, via the input means, the value or state of each of a plurality of control parameters of at least one said at least one subsystem to customise operation of the vehicle, wherein the allowable range of values or states of at least one of the plurality of control parameters of a given one of the at least one baseline subsystem control modes is dependent at least in part on the value or state of at least one other of the plurality of control parameters of the baseline subsystem control mode.

Thus, if a user adjusts the value or state of one parameter, the allowable range of values or states of one or more other parameters may also change. For example, if the user adjusts a parameter that affects responsiveness of a powertrain to actuation of an accelerator pedal, the adjustment made being such that the powertrain has an increased responsiveness to depression of the accelerator pedal, for example by developing an increased amount of drive torque for a given amount of travel of the accelerator pedal in a given situation, the control system may increase the lower bound of the user-selectable range of the amount of wheel slip that must occur in order to trigger a traction control system to intervene and reduce the amount of torque applied to one or more wheels by the powertrain.

In some embodiments, in the event the user adjusts the value or state of one or more parameters of a baseline subsystem control mode, the system may permit the user to overwrite the stored value or state, the value or state of which has been changed. Alternatively or in addition, the system may permit the user to store the new value or state of each control parameter that has been changed, or the value or state of each of the plurality of control parameters associated with a given control mode, following adjustment of one or more of the parameters, in the form of a new mode or sub-mode. In some such embodiments, the new mode or sub-mode may remain linked to the baseline subsystem control mode that was originally adjusted, such that the allowable range of values of the control parameters remain dependent at least in part on the originally selected baseline subsystem control mode.

The control system may be configured wherein the allowable range of values or states of at least one of the plurality of control parameters of the at least one subsystem is further dependent at least in part on the identity of the baseline subsystem control mode in respect of which the value or state of at least one control parameter is to be adjusted.

It is to be understood that the control modes may also be referred to as driving modes The control system may be configured to allow a user to store in a memory of the control system the adjusted value or state of each said at least one control parameter defining a user-configured subsystem control mode.

In some embodiments, in the event the user adjusts the value or state of one or more parameters of a baseline subsystem control mode, the system may permit the user to overwrite the stored value or state, the value or state of which has been changed, for that baseline subsystem control mode. Alternatively or in addition, the system may permit the user to store the new value or state of each control parameter that has been changed, or the value or state of each control parameter the value of which may be adjusted, regardless of whether the value has been adjusted, following adjustment of one or more parameters, in the form of a new user-configured subsystem control mode or sub-mode. In some such embodiments, the new mode or sub-mode may remain linked to the baseline subsystem control mode that was originally adjusted, such that the allowable range of values of the control parameters remain dependent at least in part on the identity of the baseline subsystem control mode that was adjusted in order to generate the user-configured subsystem control mode. In some embodiments the control system may store in the memory of the control system the adjusted value or state of each said at least one control parameter defining the user-configured subsystem control mode and an indication of the identity of the baseline subsystem control mode from which the user-configured subsystem control mode was derived.

The control system may be configured to allow a user to select a stored user-configured subsystem control mode via the input means and to initiate control of the or each of the at least one vehicle subsystems in said user-configured subsystem control mode.

The control system may be configured to allow a user subsequently to adjust, in respect of a stored user-configured subsystem control mode, the value or state of at least one of said at least one control parameters of at least one of the plurality of subsystems.

Thus, in some embodiments, having stored a user-configured subsystem control mode, the user may subsequently adjust the value or state of at least one of said at least one control parameters.

The control system may be configured to allow a user to store a plurality of user-configured subsystem control modes in the memory of the control system.

Two or more of the user-configured subsystem control modes may share a common baseline subsystem control mode from which they are derived.

The control system may be configured to allow a user to export, from the control system to a non-transitory computer readable storage medium external to the control system, the adjusted value or state of each said at least one control parameter defining a given user-configured subsystem control mode.

The non-transitory computer readable storage medium may be in the form of a storage device such as a portable storage device such as a data disc, a data stick comprising one or more solid state memory devices, a remote server having a non-transitory computer readable storage medium or any other suitable storage device.

The control system may be configured to allow a user to export the adjusted value or state of each said at least one control parameter defining a given user-configured subsystem control mode from the control system to a non-transitory computer readable storage medium via a communications datalink.

Data defining the adjusted value or state of each said at least one control parameter may be exported via a wireless datalink. In some alternative embodiments the data may be exported via a wired datalink, for example by connecting a non-transitory computer readable storage medium to the control system via (say) a USB (Universal Serial Bus) connector or any other suitable means.

The non-transitory computer readable storage medium may be remote from the vehicle. By remote is meant that the non-transitory computer readable storage medium is external to the vehicle.

The control system may be configured to export the adjusted value or state of each said at least one control parameter defining a given user-configured subsystem control mode to a non-transitory computer readable storage medium via a wireless communications datalink.

The control system may itself comprise a wireless data communications device for effecting wireless data communications. Alternatively the control system may communicate with a wireless data communications device external to the control system but onboard the vehicle, by means of which the control system may export data to a non-transitory computer readable storage medium.

The control system may be configured to allow a user to import to the control system, from a non-transitory computer readable storage medium external to the control system, the adjusted value or state of each said at least one control parameter defining a given user-configured subsystem control mode.

Thus in some embodiments the user may cause the control system to download data defining a given user-configured control mode from the external non-transitory computer readable storage medium, which may be in the form of a data disc, solid state memory device, remote server or any other suitable non-transitory computer readable storage medium.

The control system may be configured to allow a user to import to the control system, from a non-transitory computer readable storage medium external to the control system, the adjusted value or state of each said at least one control parameter defining a given user-configured subsystem control mode, provided the user provides a predefined input to the control system indicative that the user is authorised to import the adjusted value or state of each said at least one control parameter defining a given user-configured subsystem control mode.

The control system may be configured to require a user to input identification data to the control system to verify the user is authorised, the control system being configured to consider that the user is authorised if the system determines that the identification data corresponds to predefined, authorised identification data.

The identification data may comprise a username and/or password predefined by the user or control system. The identification data may be input by means of a keypad, optionally a touchscreen keypad, a camera, a scanner, or any other suitable means. The camera or scanner may be arranged to input fingerprint or retinal data such as an image of at least a portion of a finger or retina.

Optionally, the input means comprises at least one selected from amongst a rotary switch selector device, a lever-type switch selector device, one or more button devices and one or more touchscreen devices.

The one or more button devices may include one or more softkeys.

Optionally, the control modes comprise at least one control mode adapted for driving on a driving surface of relatively low surface coefficient of friction.

Optionally, the control modes comprise at least one control mode adapted for driving on at least one of a snowy surface, an icy surface, grass, gravel, snow, mud and sand.

Optionally at least one said at least one subsystem includes a powertrain subsystem, a brakes subsystem or a suspension subsystem.

The control system may comprise an electronic processor having an electrical input for receiving a signal from the input means for permitting a user to provide the input to the control system, and an electronic memory device electrically coupled to the electronic processor and having instructions stored therein,
wherein the processor is configured to access the memory device and execute the instructions stored therein such that it is operable to allow a user to adjust, via the input means, the value or state of the at least one of said at least one control parameters of at least one of the plurality of subsystems to customise operation of the vehicle.

In a further aspect of the invention for which protection is sought there is provided a vehicle comprising a control system according to any preceding claim.

In one aspect of the invention for which protection is sought there is provided a method of controlling at least one subsystem of a vehicle by means of a control system, the method comprising:
initiating control of the or each of the at least one vehicle subsystems in one of a plurality of baseline subsystem control modes by setting at least one control parameter of the or each of the at least one subsystems to a predetermined, stored, value or state applicable to that baseline subsystem control mode, each baseline subsystem control mode corresponding to one or more different driving conditions for the vehicle; and
receiving by means of input means a user input to the control system,
the method comprising, for at least one of the plurality of baseline subsystem control modes, allowing a user to define, via the input means, a user-configured subsystem control mode based on one said at least one baseline subsystem control mode by adjusting the value or state of at least one of said at least one control parameters to a value or state other than the predetermined stored value or state applicable to that baseline control mode, the method comprising causing the subsystem controller to initiate control of the or each of the at least one vehicle subsystems in the user-configured subsystem control mode.

In an aspect of the invention for which protection is sought there is provided a non-transitory computer readable storage medium carrying a computer readable code for controlling a vehicle to carry out a method according to another aspect.

In an aspect of the invention for which protection is sought there is provided a computer program product executable on a processor so as to implement the method of another aspect.

In an aspect of the invention for which protection is sought there is provided a non-transitory computer readable medium loaded with the computer program product of another aspect.

In an aspect of the invention for which protection is sought there is provided a processor arranged to implement the method of another aspect, or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which:

FIG. 3 is a table showing which vehicle subsystem configuration mode is selected in each respective vehicle operating mode;

DETAILED DESCRIPTION

Figure 1:
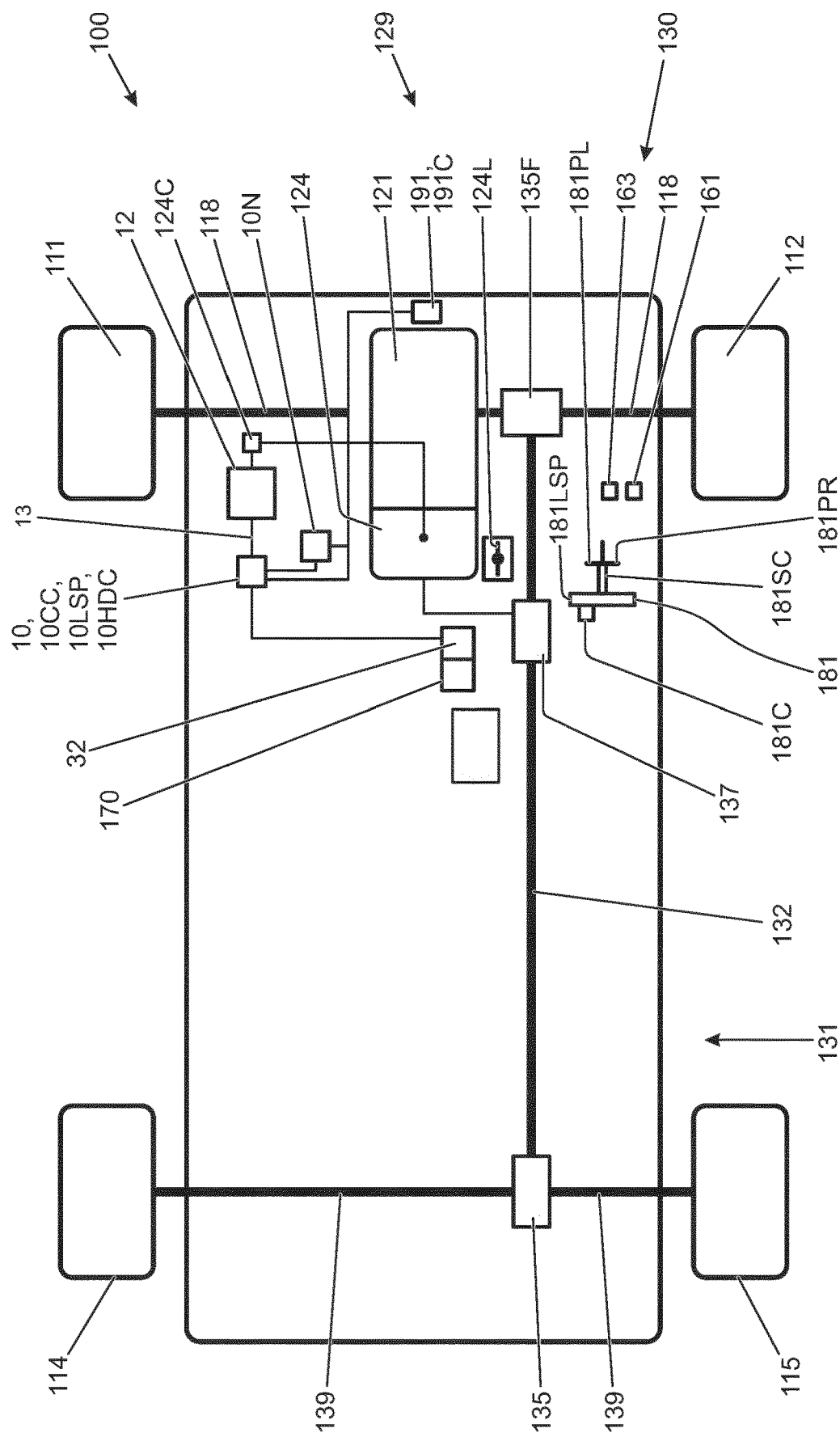
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having an automatic transmission 124. The transmission 124 has a transmission mode selector dial 124L permitting a driver to select the required transmission operating mode selected from park (P), forward drive (D), neutral (N) and reverse drive (R).

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. It is to be understood that embodiments of the present invention are suitable for use with vehicles in which the transmission 124 is arranged to drive only a pair of front wheels or only a pair of rear wheels (i.e. front wheel drive vehicles or rear wheel drive vehicles) or selectable two wheel drive/four wheel drive vehicles, or permanent four wheel drive vehicles. In the embodiment of FIG. 1 the transmission 124 is releasably connectable to the auxiliary driveline portion 131 by means of a transfer case 137, allowing selectable two wheel drive or four wheel drive operation. It is to be understood that embodiments of the invention may be suitable for vehicles having more than four wheels or less than four wheels.

In the present embodiment the transfer case 137 is operable in a 'high ratio' ('hi') or a 'low ratio' ('lo') configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing. In some embodiments the transfer case 137 may be operable in only one gear ratio configuration rather than one of two ratio configurations.

The vehicle 100 has an accelerator pedal 161, a brake pedal 163 and a steering wheel 181. The steering wheel 181 is supported by a steering column 181SC. The steering wheel 181 has a cruise control selector button 181C mounted thereto for activating an on-highway cruise control system 10CC that is implemented in software by a vehicle central controller, referred to as a vehicle control unit (VCU) 10 described in more detail below. The steering wheel 181 is also provided with a low speed progress control system selector button 181LSP for selecting operation of a low speed progress (LSP) control system 10LSP which may also be referred to as an off-road speed control system or off-road cruise control system. The LSP control system 10LSP is also implemented in software by the VCU 10. In addition to the cruise control system 10CC and LSP control system 10LSP the VCU 10 is configured to implement a hill descent control (HDC) system 10HDC that limits maximum vehicle speed when descending an incline by automatic application of a brakes (or braking) system 12d (FIG. 2) described in more detail below. The HDC system 10HDC may be activated via human machine interface (HMI) module 32.

The steering column 181SC also carries a paddle gear-shift control 181PR. The paddle gear-shift control 181 PR is configured to generate a gear-shift request signal when the paddle is pulled forwards or backwards. The gear-shift request signal is transmitted to transmission controller 124C which controls operation of the transmission 124. If the paddle control 181 PR is pulled towards the driver the gear shift request signal indicates to the controller 124C that the transmission 124 is required to up-shift, whilst if the paddle control 181 PR is pushed away from the drive the gear shift request signal indicates to the controller 124C that the transmission 124 is required to down-shift. In response to receipt of the gear-shift request signal the transmission 124 executes the requested up-shift or down-shift provided the requested shift is allowable. It is to be understood that an up-shift or down-shift may be prohibited under certain circumstances, for example where engine or transmission over-speed may result if the shift is executed. That is, an up-shift or down-shift may be prohibited if the engine speed and/or transmission speed might exceed a predetermined maximum allowable value if the shift were executed.

The transmission controller 124C is configured to trigger an up-shift or down-shift if gear-shift request signal is received for a period exceeding a predetermined gear shift request signal duration.

The VCU 10 receives a plurality of signals from various sensors and subsystems 12 provided on the vehicle 100.

Figure 2:
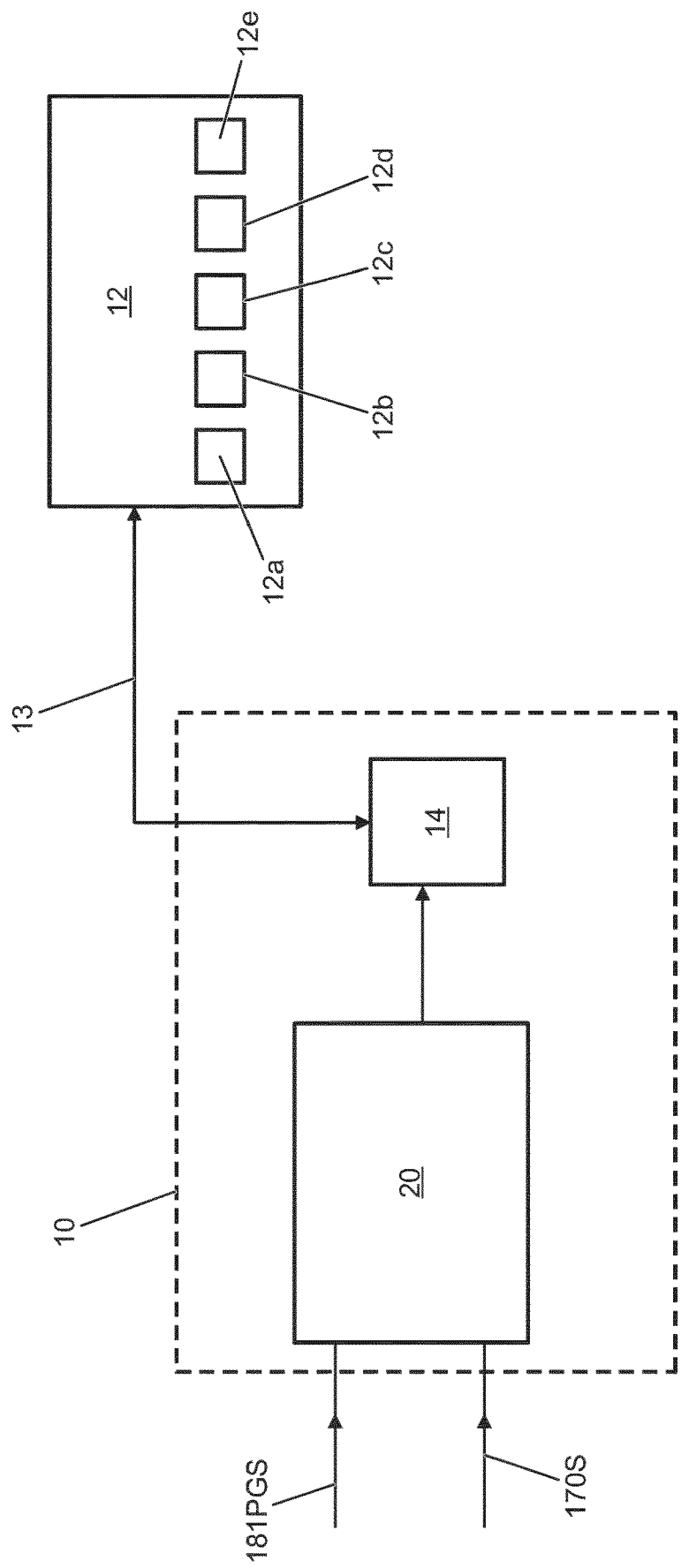
FIG. 2 is a block diagram to illustrate a vehicle control system in accordance with an embodiment of the invention, including various vehicle subsystems under the control of the vehicle control system.

FIG. 2 is a schematic diagram illustrating operation of the VCU 10 in more detail. The VCU 10 controls a plurality of vehicle subsystems 12 including, but not limited to, an engine management system 12a, a transmission system 12b that includes the transmission 124 and transmission controller 124C, an electronic power assisted steering unit 12c (ePAS unit), the brakes system 12d and a suspension system 12e. These vehicle sub-systems can be considered to form a first group of subsystems. Although five subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status. In some embodiments, instead of an ePAS unit 12c, a hydraulically operated power steering unit may be provided.

The vehicle is configured to be caused to operate, by the VCU 10, in one of a plurality of predetermined control modes. In each control mode, the subsystems 12 are caused to operate in a predetermined subsystem configuration mode suitable for a given terrain type. The control modes include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RC mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode, also referred to as a Highway or 'on-highway' mode) which is a suitable compromise mode, or general mode, for all terrain conditions and especially vehicle travel on motorways and regular roadways. Many other control modes are also envisaged including those disclosed in US2003/0200016, the content of which is hereby incorporated by reference.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

FIG. 3 is a table taken from US2003/0200016 showing the particular sub-system configuration modes that may be assumed by the subsystems 12 of a vehicle according to some embodiments of the invention in the respective different driving modes or operating modes in which the VCU 10 may operate in some embodiments.

The driving modes are:
(a) A motorway (or highway) mode;
(b) A country road mode;
(c) A city driving (urban) mode;
(d) A towing (on-road) mode;
(e) A dirt track mode;
(f) A snow/ice (on-road) mode;
(g) A GGS mode;
(h) A sand mode;
(i) A rock crawl or boulder crossing mode (RC); and
(j) A mud/ruts (MR) mode In the present embodiment, the vehicle 100 is limited to operating in the GGS mode, MR mode, RC mode, Sand mode and SPO (Highway) mode, however it will be appreciated that the invention is not limited to such an arrangement and any combination of on and off road control modes may be used within the scope of the present invention. In some embodiments, instead of a GGS mode the vehicle may have a 'Grass/Snow' (GS) mode in which vehicle handling is optimised for travel over grass or snow, and a separate 'Gravel' (G) mode in which vehicle handling is optimised for travel over gravel. In some embodiments the vehicle may have a 'Wade' mode in which vehicle handling is optimised for wading operations in which the vehicle travels through water. In some embodiments, in the wade mode the vehicle 100 is operated in such a manner that the engine 121 remains switched on at all times and the speed of the engine 121 does not fall below a predetermined value. This is so as to reduce the risk that liquid through which the vehicle is wading enters the engine exhaust system due to the head of liquid at an exhaust gas outlet of the exhaust system.

With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be proportional to vehicle speed in some driving modes. As shown in FIG. 3, the amount of assistance is 'speed proportional' in each mode shown except the Rock Crawl (RC) mode.

The brakes system 12d may be arranged to provide relatively high brake force for a given amount of pressure or 'effort' applied to the brake pedal 163 or a relatively low brake force, depending on the driving mode.

The brakes system 12d may also be arranged to allow different levels of wheel slip when an anti-lock braking system is active, (relatively low amounts on low friction ("low-mu" surfaces) and relatively large amounts on high friction surfaces).

An electronic traction control (ETC) system may be operated in a high mu or low mu configuration, the system tolerating greater wheel slip in the low mu configuration before intervening in vehicle control compared with the high mu configuration.

A dynamic stability control system (DSC) may also be operated in a high mu or low mu configuration.

The engine management system 12a may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The transfer case 137 may be operated in a high range (HI) subsystem configuration mode or low range (LO) subsystem configuration mode as described herein.

In some embodiments, a centre differential and a rear differential may be provided that each include a clutch pack that is controllable to vary the degree of locking of the respective differential between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential may be controlled in the same or similar way in some embodiments.

The VCU 10 receives a plurality of signals 16, 17 from a plurality of vehicle sensors and are representative of a variety of different parameters associated with vehicle motion and status. As described in further detail below, the signals 16, 17 provide, or are used to calculate, a plurality of driving condition indicators which are indicative of the nature of the conditions in which the vehicle is travelling. The manner in which this is accomplished is explained in more detail in UK patent GB2492655 to the present applicant, the content of which is incorporated herein by reference as noted above.

The sensors (not shown) on the vehicle include, but are not limited to, sensors which provide continuous sensor outputs 16 to the VCU 10, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an accelerator pedal position sensor and longitudinal, lateral and vertical motion sensors. In some other embodiments, only a selection of the aforementioned sensors may be used.

The VCU 10 also receives a signal from the electronic power assisted steering unit (ePAS unit 12*c*) of the vehicle 100 to indicate the steering force that is applied to the wheels (steering force applied by the driver combined with steering force applied by the ePAS unit 12*c*).

The vehicle 100 is also provided with a plurality of sensors which provide discrete sensor output signals 17 to the VCU 10, including a cruise control status signal (ON/OFF), a transfer box or transfer case 137 status signal (whether the gear ratio is set to the high (HI) range or low (LO) range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension ride-height status signal (HI/STD/LO, indicating whether the ride-height is set to a high, standard or low setting, respectively), and a Dynamic Stability Control (DSC) signal (ON/OFF).

The VCU 10 is configured to generate an SCS activity signal derived from several outputs from an SCS ECU (not shown), which contains the DSC (Dynamic Stability Control) function, the TC (Traction Control) function, ABS and HDC algorithms. The SCS activity signal indicates DSC activity, TC activity, ABS activity, brake interventions on individual wheels, and engine torque reduction requests from the SCS ECU to the engine 121.

The vehicle subsystems 12 may be controlled automatically in a given subsystem control mode (in an "automatic mode" or "automatic condition" of operation of the VCU 10) in response to a control output signal 30 from the selector module 20 and without the need for driver input. In the present embodiment, if the VCU 10 is in the automatic mode of operation the vehicle subsystems are caused automatically to assume the subsystem control mode corresponding to the control output signal 30 from the selector module 20. Alternatively, the vehicle subsystems 12 may be operated in a given subsystem control mode according to a manual user input (in a "manual mode" or "manual condition" of operation of the VCU 10) via the HMI module 32. Thus in the manual mode of operation the user determines in which subsystem control mode the subsystems will be operated by selection of a required system control mode (operating mode). The HMI module 32 comprises a display screen (not shown) and a user operable switchpack 170. The user may select between the manual and automatic modes (or conditions) of operation of the VCU 10 via the switchpack 170. When the VCU 10 is operating in the manual mode or condition, the switchpack 170 also allows the user to select the desired subsystem control mode. The selector module 20 receives a signal 170S from the switchpack 170 as shown in FIG. 2, by means of which the selector module 20 determines whether to operate in the manual mode or automatic mode.

It is to be understood that the subsystem controller 14 may itself control the vehicle subsystems 12*a*-12*e* directly via the signal line 13, or alternatively each subsystem may be provided with its own associated intermediate controller (not shown in FIG. 1) for providing control of the relevant subsystem 12*a*-12*e*. In the latter case the subsystem controller 14 may only control the selection of the most appropriate subsystem control mode for the subsystems 12*a*-12*e*, rather than implementing the actual control steps for the subsystems. The or each intermediate controller may in practice form an integral part of the main subsystem controller 14.

In addition, for each subsystem control mode, each of the discrete sensor signals (also considered to be driving condition indicator signals) 17 (e.g. trailer connection status ON/OFF, cruise control status ON/OFF) is also used to calculate an associated probability for each of the control modes, GGS, RC, Sand, MR or SP OFF. So, for example, if cruise control is switched on by the driver of the vehicle, the probability that the SP OFF mode is appropriate is relatively high, whereas the probability that the MR control mode is appropriate will be lower.

It is to be understood that, for certain subsystems 12, the subsystem 12 may be placed in the same subsystem configuration mode when the vehicle is operated in more than one driving mode (control mode). For example, in the case of a suspension subsystem, the subsystem configuration modes may include different vehicle ride height values. The suspension subsystem may be placed in the same configuration mode, i.e. the ride height may be set to the same ride height value, in more than one driving mode. Thus a given subsystem may remain in the same subsystem configuration mode (e.g. assume the same ride height value) in more than one driving mode.

For example, as described herein, in the present embodiment the air suspension system of the vehicle has three subsystem configuration modes: low ride-height, medium ride-height and high ride-height subsystem configuration modes. The suspension system may be set to the medium ride-height subsystem configuration mode when the vehicle is operating in more than one control mode (driving mode), such as an on-highway control mode and a grass/gravel/snow control mode. Thus, if the vehicle operates in the on-highway control mode, the suspension system is set to the medium ride-height subsystem control mode, and may be referred to as operating in the on-highway control mode. Similarly, if the vehicle operates in the grass/gravel/snow mode, the suspension system is set to (or remains in) the medium ride-height subsystem control mode, and may be referred to as operating in the grass/gravel/snow control mode. Thus, the subsystem configuration modes are unique, distinct modes in which a given subsystem may be configured, whilst a given subsystem may operate in the same subsystem configuration mode in each of a plurality of control modes (driving modes).

In the present embodiment the VCU 10 is configured to permit a user to change the configuration of each of a predetermined plurality of vehicle subsystems in each of a predetermined set of driving modes. In the present embodiment, the configuration of a predetermined set of subsystems may be changed in each of the following driving modes: GGS mode, MR mode, RC mode and Sand mode.

Figure 4:
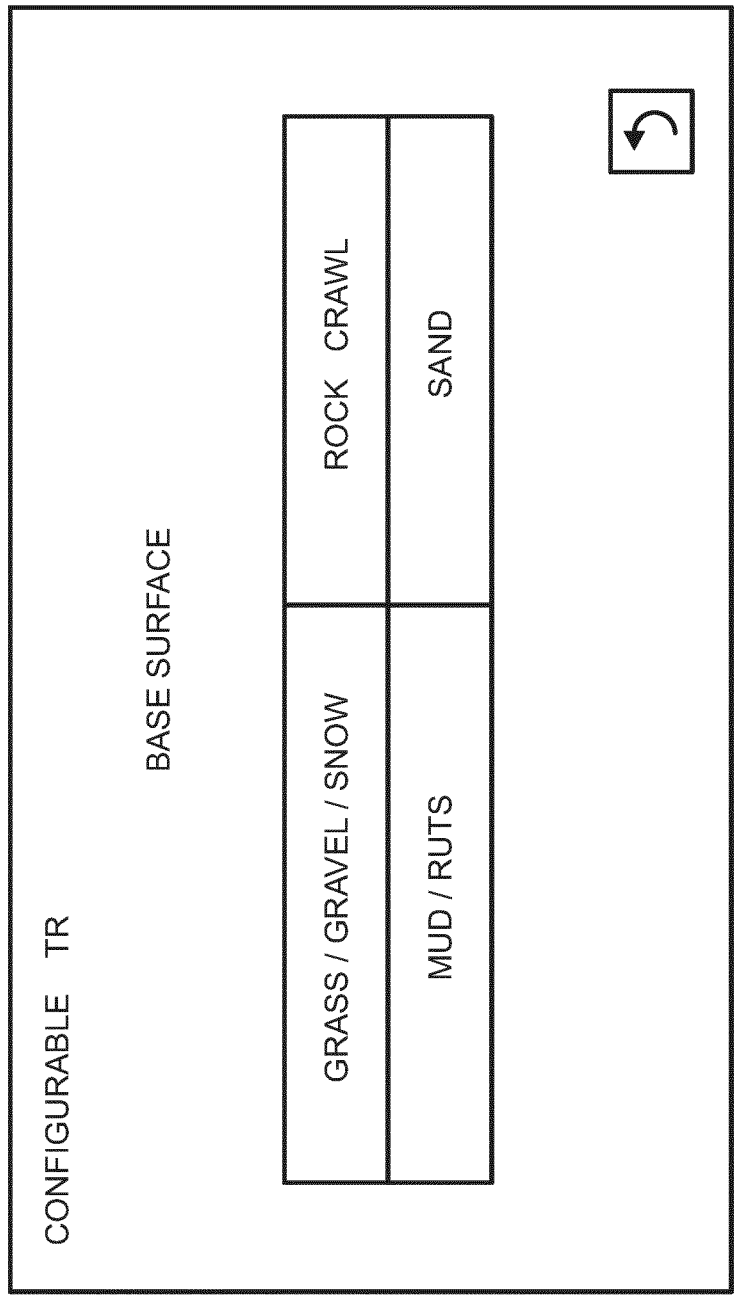
FIGS. 4 to 10 are schematic illustrations of a display provided to a user via an HMI module.

In order to adjust the configuration of the plurality of vehicle subsystems, a user selects a 'configurable TR' (configurable terrain response) mode of operation. FIG. 4 is a schematic illustration of a display provided to a user via HMI module 32 when the configurable TR mode is selected. As can be seen from FIG. 4, the user is presented with a list of the four driving modes for which the configuration of a plurality of vehicle subsystems may be adjusted. The 'default' settings of the driving modes are referred to as 'base settings', and the driving modes with default (unadjusted) settings may be referred to as 'base driving modes'. The base driving modes each correspond to a different type of driving surface, and the driver is asked to select the base driving mode (or 'base surface' mode) that is to be adjusted. In the present embodiment, the driver selects the driving mode that is to be adjusted by touching the display screen of the HMI module 32 at the location of the text identifying the base driving mode that is to be adjusted. The VCU 10 then displays a screen that permits the user to adjust the parameters that are permitted to be adjusted for the particular selected base driving mode.

Figure 5:
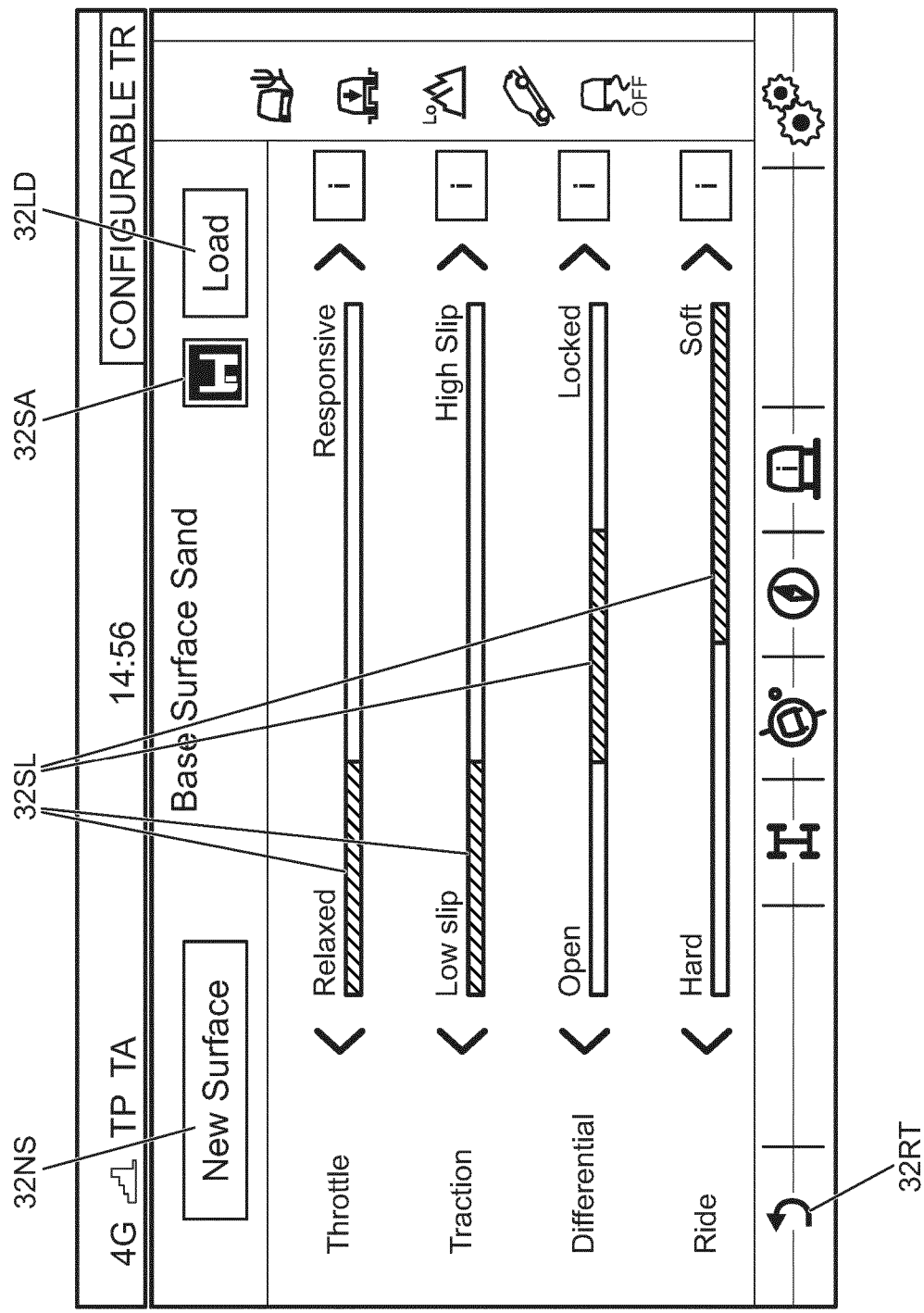

FIG. 5 shows, by way of example, the screen that is displayed if a user selects the Sand base driving mode. The parameters that the user is permitted to adjust are listed as 'throttle', 'traction', 'differential' and 'ride'. Input means in the form of sliders 32SL permit the user to adjust each of the parameters between extremes by sliding the slider between left and right positions. It is to be understood that in some embodiments, one or more other input means may be provided in addition or instead, for adjusting one or more parameters. For example, in some embodiments a rotary knob or a lever may be provided.

As can be seen from FIG. 5, the 'throttle' parameter permits the user to adjust the responsiveness the throttle between a 'relaxed' condition (slider 32SL fully to the left of the allowable range of travel, as shown in FIG. 5) and a 'responsive' condition (slider 32SL fully to the right of the allowable range of travel). In the 'relaxed' condition, the amount of torque developed by the engine 121 for a given amount of initial travel of the accelerator pedal 161 is less than that in the 'responsive' condition.

The 'traction' parameter allows the user to adjust the amount of wheel slip permitted by the traction control (TC) function of the SCS ECU. With the slider fully to the left of travel, the TC function allows relatively little slip under a given set of conditions before the TC function intervenes to prevent or reduce wheel slip, whilst with the slider fully to the right of travel the TC function allows a relatively large amount of slip under the same set of conditions.

The 'differential' parameter allows the user to adjust the amount of cross-axle lock provided by rear differential 135, and optionally in some embodiments front differential 135F. With the slider fully to the left of travel the differential 135 is fully open, whilst with the slider fully to the right of travel the differential 135 is substantially fully locked (to the extent the differential 135 permits). In embodiments having a centre differential, the VCU 10 may permit the amount of lock of the centre differential to be adjusted by means of a similar slider or other arrangement.

The 'ride' parameter allows the user to adjust ride hardness by sliding the slider between a 'hard' condition, with the slider fully to the left of travel, and a 'soft' condition, with the slider fully to the right of travel. In the 'hard' condition, the fluid (air) suspension is set to provide a relatively highly damped (hard) ride experience whilst in the 'soft' condition the suspension is set to provide a relatively undamped (soft) ride experience.

In the present embodiment, the VCU 10 permits the 'configurable TR' mode to be selected and adjustment of parameters to take place only if the vehicle is stationary and the transmission is in the park (P) mode. In some alternative embodiments, the configurable TR mode may be selected and adjustment of one or more parameters made regardless of the selected transmission mode provided the vehicle is stationary. In some alternative embodiments the configurable TR mode may be selected even if the vehicle is moving, but adjustment of the one or more parameters may be made only whilst the vehicle is stationary.

In some still further embodiments, parameter adjustment may take place even if the vehicle is moving. Other arrangements may be useful in some embodiments.

It is to be understood that the VCU 10 is further configured to limit the range of allowable values or states of a given parameter of a given driving mode. The VCU 10 limits the range of values to a predetermined allowable range, preventing a user selecting a value that is outside of the predetermined allowable range. In some embodiments the allowable range is determined by the range of values of a given parameter that are permitted across all base driving modes. Thus, the allowable range of a given parameter may be from the lowest value permitted in any base driving mode to the highest value permitted in any base driving mode.

By way of example, as noted above, in the present embodiment the 'throttle' parameter permits the user to adjust the responsiveness the throttle between a 'relaxed' condition and a 'responsive' condition. When the vehicle is operated in the GGS base driving mode the throttle parameter is set to the 'relaxed' condition, whilst in the Sand base driving mode the throttle parameter is set to the 'responsive' condition. In the present embodiment it is not possible to set the 'throttle' parameter to a condition that is more relaxed than that employed by the base GGS driving mode, or more responsive than that employed by the Sand base driving mode.

Figure 6:
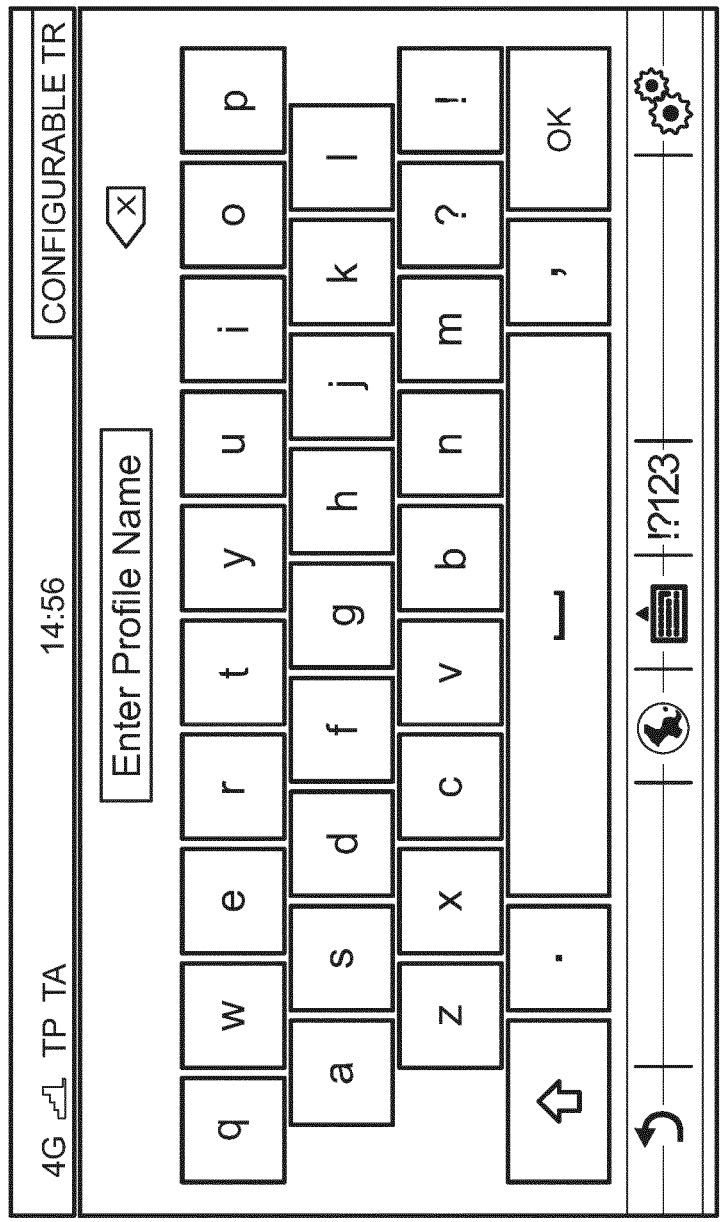

Once a user has adjusted one or more parameters, the user may save the adjusted configuration by pressing 'save' icon 32SA. If the 'save' icon 32SA is pressed, the user is taken to a 'save' screen. A schematic illustration of an example of such a screen is presented in FIG. 6. The user is invited to input a name for the adjusted driving mode parameter profile they have created, pressing an 'OK' icon when the name has been entered. As shown in FIG. 6 the name is input via an alphanumeric keypad displayed on the touchscreen display of the HMI 32. Once the name has been entered and the 'OK' icon pressed, the VCU 10 stores a record of the adjusted parameters, the identity of the base surface (in the present example 'Sand' and the name of the profile assigned by the user in a memory of the VCU 10. The display screen of the HMI 32 then returns to the previous screen shown in FIG. 5. The user may exit the display by pressing the 'return' icon 32RT, in which case the display reverts to the original 'configurable TR' screen. The saved 'adjusted configuration' may be referred to as a user-configured driving mode or user-adjusted driving mode.

The user may reload an existing adjusted configuration that has been previously saved by pressing the 'Load' icon 32LD. Alternatively, the user may reset the parameters to their default values for the Sand driving mode by pressing the 'New Surface' icon 32NS. The user may then adjust one or more of the parameters again, and save a further adjusted configuration if they so desire.

Figure 7:
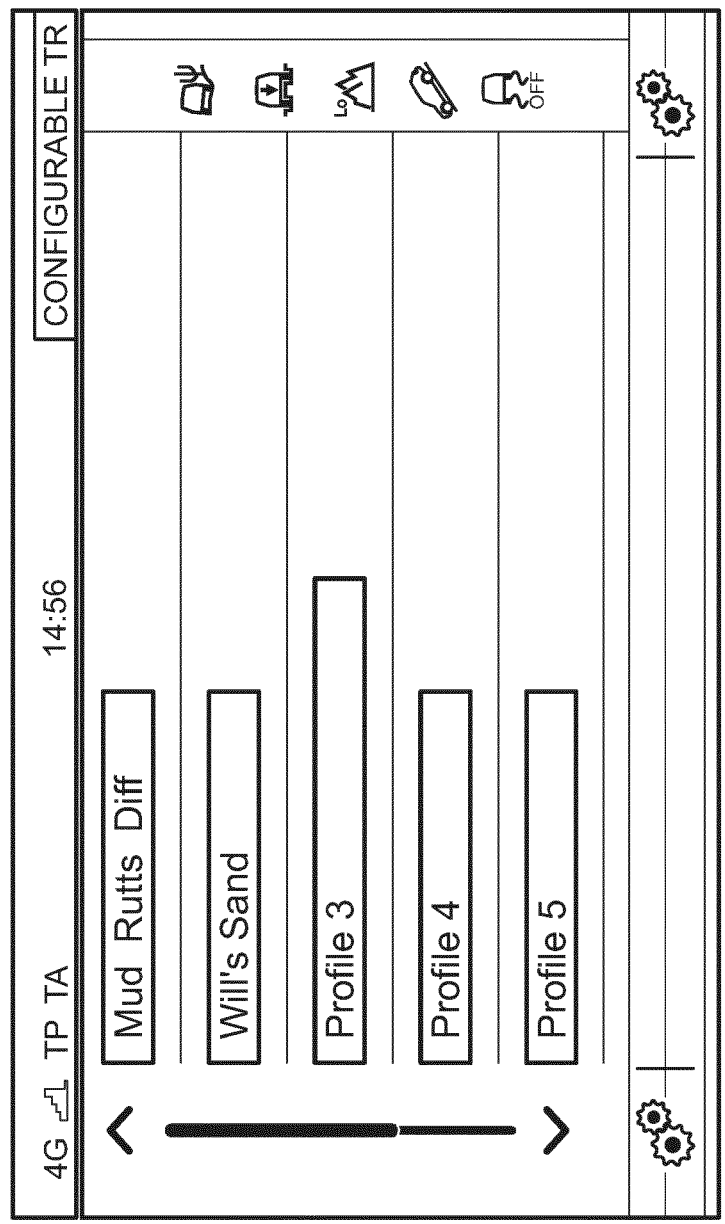

In order to access user-configured driving modes that have been saved, the user may select any such profile from a 'configurable TR' profiles list shown in FIG. 7. This list may be caused to be displayed by selection of a 'saved profiles' function via HMI 32. When the profiles list is displayed, as shown in FIG. 7, the user may scroll through a list of saved profiles and select the user-configured driving mode in which the user wishes to operate. When a given profile is selected, the VCU 10 configures each vehicle subsystem 12a-12e according to the base driving mode that the user-configured driving mode corresponds to (such as Sand mode in the example given above) but sets the each of the parameters that were user-adjustable to the user-adjusted, stored values.

Figure 8:
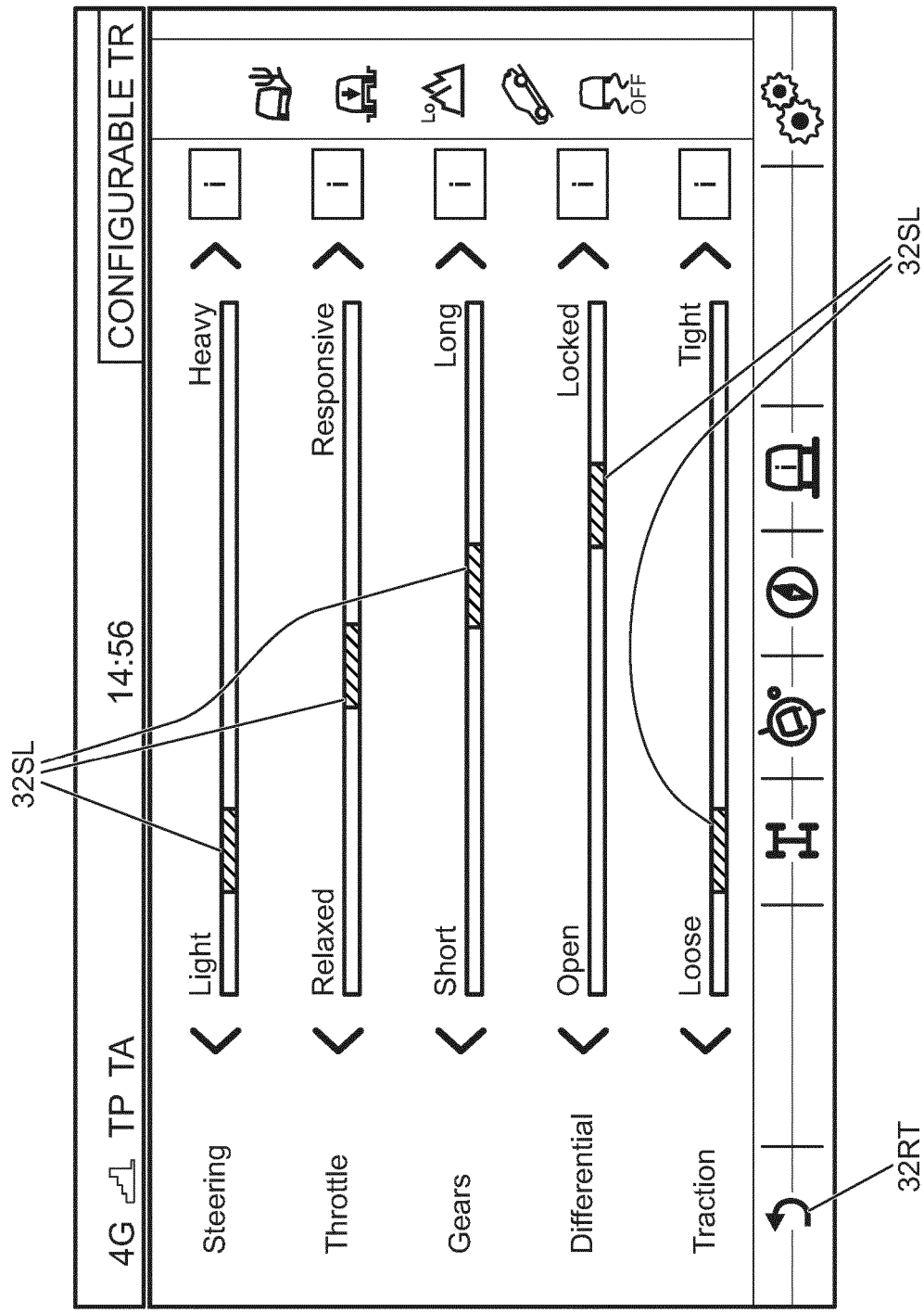

It is to be understood that the predetermined parameters that may be adjusted for a given base surface driving mode may differ. FIG. 8 is a schematic illustration of an example of a display that may be provided by the VCU 10 on the display screen (touch screen) of HMI 32 when a different base surface is selected, other than the Sand base surface. For this base surface, the parameters are listed as 'steering', 'throttle', 'gears', 'differential' and 'traction'. Adjustment of parameters 'throttle', 'differential' and 'traction' has been described above with respect to FIG. 5.

The 'steering' parameter allows the user to adjust the amount of steering assistance provided to a driver by the ePAS unit 12c when turning the steering wheel 181. The higher the value of the steering parameter, the lower the amount of torque that a user is required to apply to the steering wheel 181 to turn the wheel 181. That is, the amount of torque assistance provided by the ePAS unit 12c to assist the user in turning the wheel is greater the greater the value of the steering parameter. In the present embodiment the amount of steering assistance is proportional to vehicle speed in each of the driving modes except the RC mode, where the amount of steering assistance is set to 'high' and is substantially independent of vehicle speed. This is because, in the RC mode, the vehicle 100 is typically driven at crawl speed over highly uneven rocky terrain, typically requiring relatively abrupt changes in steering angle as the rocky surface is negotiated. With reference to FIG. 8 and the 'steering' parameter, movement of the slider to the leftmost limit of travel increases the amount of steering assistance provided by the ePAS unit 12c at a given speed, whilst movement of the slider to the rightmost limit of travel decreases the amount of steering assistance provided by the ePAS unit 12c at a given speed.

The 'gears' parameter allows the user to adjust the relative abruptness of gear changes effected by a controller of the automatic transmission 124. The amount of time taken may be varied from a relatively short period, i.e. gear changes are relatively abrupt, with the slider at its leftmost extent of travel, to a relative long period, with the slider at its rightmost extent of travel. It is to be understood that relatively abrupt gear changes may result in more harsh variations in the amount of torque applied to driven wheels of the vehicle and may therefore not be suited to relatively slippery surfaces such as those for which GGS mode may be configured. It is to be understood that the values of engine speed at which shifts between a given pair of gears occur in a given driving mode may be different from one driving mode to another.

Figure 9:
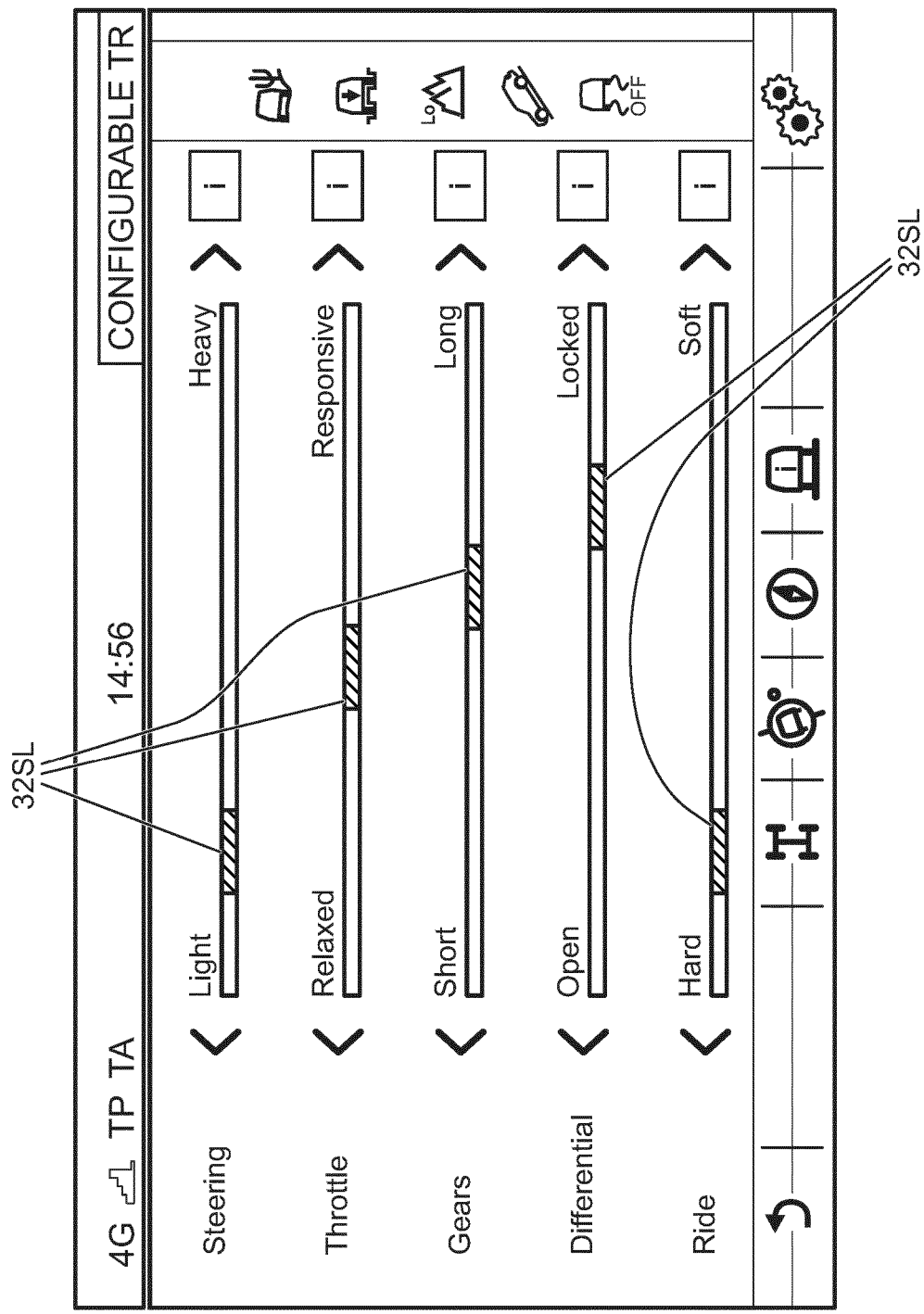

FIG. 9 shows another example of a display screen allowing a different combination of parameters to be adjusted, in the example shown the parameters are 'steering', 'throttle', 'gears', 'differential' and 'ride', each of which has been discussed above with respect to FIG. 5 or FIG. 8.

Figure 10:
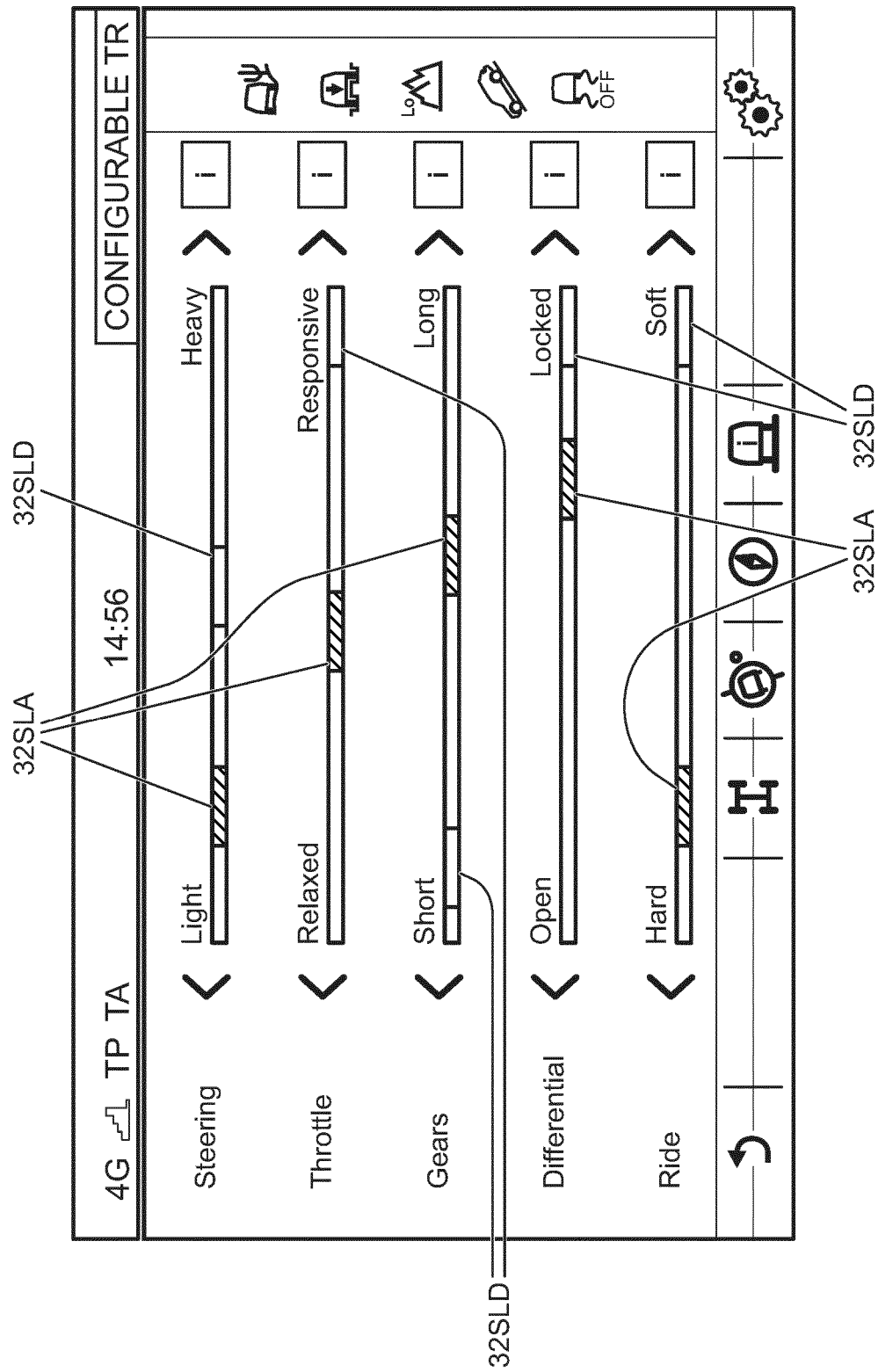

FIG. 10 shows a further example of a display screen, in this case the display screen of FIG. 9, where the default positions of the sliders are shown in 'grey' 32SLD whilst the user-adjusted position of each slider is shown in an orange colour 32SLA (shown hatched in FIG. 10). This feature enables the user to appreciate the extent to which the slider 32SL has been moved from its default position.

It is to be understood that, in some embodiments, adjustment of one slider position may cause the VCU 10 to change the allowable range over which the user is permitted to adjust another parameter displayed on the screen. In some embodiments this feature may be implemented in order to reduce the risk of loss of composure of the vehicle, for example due to experiencing excessive slip under certain conditions. For example, if the user selects the GGS base driving mode and selects a relatively short gear change period, the VCU 10 may limit the allowable range of values of parameter 'traction', such that a very 'tight' traction control is not permitted. This is at least in part because a GGS surface is typically a surface of relatively low surface coefficient of friction where slip may be particularly undesirable due to the risk of surface modification. By 'tight' traction control is meant that the TC function intervenes to reduce the amount of wheel slip when the amount of wheel slip exceeds a traction control intervention slip threshold value that is relatively low. It is to be understood that relatively abrupt changes in the amount of torque applied to a driven wheel may occur if relatively short gear change periods are employed, resulting in an increased risk of wheel slip on surfaces presenting a relatively low surface coefficient of friction. As noted herein, this may be highly undesirable in the case of relatively fragile surfaces such as grass, where undesirable surface modification may occur as a result. In contrast, slip on a sandy surface may be less problematic in terms of the risk of surface modification. Indeed, a certain amount of wheel slip when travelling over a sandy surface may be desirable in order to improve traction due to compaction of the sand.

In some embodiments, an indication may be provided on the display screen of the allowable range of travel of the sliders 32SLA displayed thereon. The indication of the allowable range of travel of one slider 32SLA may change dynamically in response to movement of another slider 32SLA. Thus, the allowable range of travel of one slider 32SLA may narrow, or broaden, in response to movement of the other slider 32SLA. This feature has the advantage that guidance may be provided to a user to help them in establishing an appropriate vehicle subsystem configuration.

Figure 11:
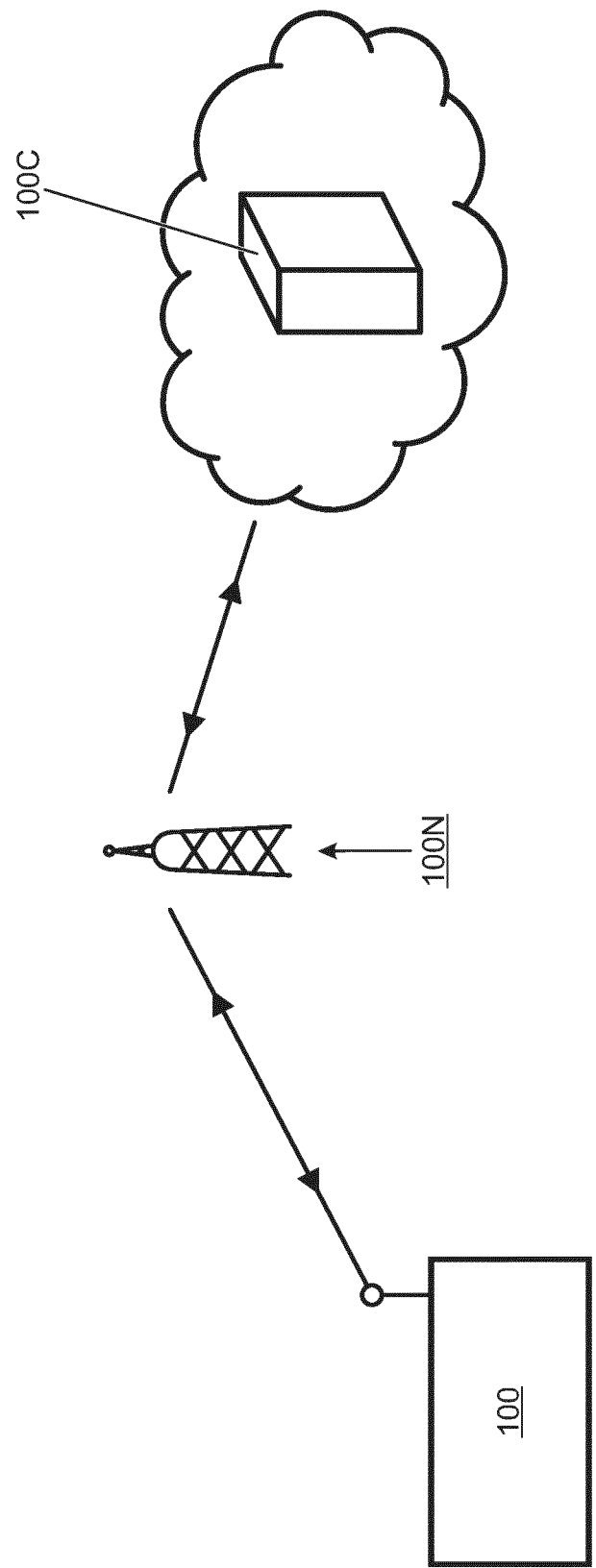
FIG. 11 is a schematic illustration of a vehicle 100 according to an embodiment of the present invention showing communication between the vehicle and a server via a datalink provided by a cellular telecommunications network, the server providing a cloud data storage service.

In some embodiments, the VCU 10 may be configured to export data defining the user-configured driving modes that have been saved by the VCU 10 in memory to a non-transitory computer readable storage medium external to the vehicle 100. In the present embodiment the VCU 10 is configured to communicate with a server 100C remote from the vehicle 100 via a datalink provided by a wireless cellular telecommunications network 100N as illustrated schematically in FIG. 11. It is to be understood that the server 100C may be a 'cloud-based' server 100C, providing a cloud-based data storage service. The server stores the exported data in a non-transitory computer readable storage medium of the server 100C.

In the present embodiment, the VCU 10 is configured to allow a user to input a personal identification code to the VCU 10 via the HMI 32. When a user commands the VCU 10 to export data defining the user-configured driving modes that have been saved by the VCU 10 the VCU 10 communicates with the remote server 100C and stores the data together with the user's personal identification code. This is so as to enable the data to be downloaded at a later date by the same user to the same or a different vehicle. For example, if the user deletes from the memory of the VCU 10 some or all of the data defining the user-configured driving modes that have been saved, the user may restore the data by downloading some or all of the deleted data. The personal identification code may for example comprise a username, a password, a number (such as a personal identification number (PIN)) or any other suitable code. In some embodiments, a user may be required to input a username and a password in order to be able to export and and/or import data defining one or more user-configured driving modes.

Similarly, if the user transfers to a second vehicle other than the first vehicle in which the data defining the user-configured driving modes was initially input, the user may enter their personal identification code (or username and password) to the VCU 10 of the second vehicle, which then gives the user the option to download from a remote server 100C the data defining the user-configured driving modes that were saved by the VCU 10 of the first vehicle. The user may therefore enjoy the benefit of their user-configured driving modes in any vehicle according to an embodiment of the present invention.

Upon receipt of such a code, the VCU 10 communicates with the remote server 100C to verify that the personal identification code corresponds to an authorised code. If the personal identification code does correspond to an authorised code, the VCU 10 checks whether data in respect of one or more user-configured subsystem control modes is available for download from the server 100C. If such data is available, the VCU 10 downloads from the server 100C the available data in respect of one or more user-configured subsystem control modes.

It is to be understood that, in the present embodiment, the user is only able to access data in respect of one or more user-configured subsystem control modes if they have previously been exported by the user. However it is to be understood that in some embodiments a user may be permitted to download data in respect of one or more user-configured subsystem control modes that have been purchased by the user, or shared by one or more other users.

Other arrangements may be useful in some embodiments.

Once data in respect of one or more user-configured subsystem control modes has been downloaded, the VCU 10 makes the data available to the user so the user can select one or more of the one or more user-configured subsystem control modes that have been downloaded. The driver may then select a desired driving mode and cause the VCU 10 to operate in that driving mode in the manner described earlier.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A vehicle control system for controlling at least one subsystem of a vehicle; the vehicle control system comprising:
a subsystem controller for initiating control of the or each at least one vehicle subsystem in one of a plurality of baseline subsystem control modes by setting at least one control parameter of the or each at least one subsystem to a predetermined, stored, value or state applicable to that baseline subsystem control mode, each baseline subsystem control mode corresponding to one or more different terrain types for the vehicle; and
input means for permitting a user to provide an input to the vehicle control system,
wherein two or more of the plurality of baseline subsystem control modes are configurable by the user, and for a first user-configurable baseline subsystem control mode of the two or more user-configurable baseline subsystem control modes, the vehicle control system is configured to allow the user to define, via the input means, a user-configured subsystem control mode based on said first user-configurable baseline subsystem control mode by adjusting the value or state of at least one of said at least one control parameter to a value or state other than the predetermined stored value or state applicable to the first user-configurable baseline subsystem control mode, wherein an allowable range of values or states of said at least one control parameter of the or each at least one subsystem is dependent at least in part on the identity of the first user-configurable baseline subsystem control mode in respect of which the value or state of at least one control parameter is to be adjusted, and further wherein the allowable range of values or states of said at least one control parameter for the first user-configurable baseline subsystem control mode is different than an allowable range of values or states of said at least one control parameter for another of the two or more user-configurable baseline subsystem control modes, and wherein the vehicle control system is configured to cause the subsystem controller to initiate control of the or each of the at least one vehicle subsystem in the user-configured subsystem control mode.

2. A control system according to claim 1 configured to allow the user to adjust, via the input means, the value or state of each of a plurality of control parameters of at least one of said at least one subsystem to customize operation of the vehicle, wherein the allowable range of values or states of at least one of the plurality of control parameters of a given one of said two or more user-configurable baseline subsystem control modes is dependent at least in part on the value or state of at least one other of the plurality of control parameters of the given user-configurable baseline subsystem control mode.

3. A control system according to claim 1 configured to allow the user to store in a memory of the control system the adjusted value or state of each said at least one control parameter defining a user-configured subsystem control mode.

4. A control system according to claim 3 configured to allow the user to select a stored user-configured subsystem control mode via the input means and to initiate control of the or each of the at least one vehicle subsystem in said user-configured subsystem control mode.

5. A control system according to claim 4 configured to allow the user subsequently to adjust, in respect of a stored user-configured subsystem control mode, the value or state of at least one of said at least one control parameters of at least one of the plurality of subsystems.

6. A control system according to claim 3 configured to allow the user to store a plurality of user-configured subsystem control modes in the memory of the control system.

7. A control system according to claim 6 configured to allow the user to export, from the control system to a non-transitory computer readable storage medium external to the control system, the adjusted value or state of each said at least one control parameter defining a given user-configured subsystem control mode.

8. A control system according to claim 7 configured to allow the user to export the adjusted value or state of each said at least one control parameter defining the given user-configured subsystem control mode from the control system to a non-transitory computer readable storage medium via a communications datalink.

9. A control system according to claim 8 configured to export the adjusted value or state of each said at least one control parameter defining the given user-configured subsystem control mode to a non-transitory computer readable storage medium via a wireless communications datalink.

10. A control system according to claim 7 configured to allow the user to import to the control system, from a non-transitory computer readable storage medium external to the control system, the adjusted value or state of each said at least one control parameter defining the given user-configured subsystem control mode.

11. A control system according to claim 10 configured to allow the user to import to the control system, from a non-transitory computer readable storage medium external to the control system, the adjusted value or state of each said at least one control parameter defining a given user-configured subsystem control mode, provided the user provides a predefined input to the control system indicative that the user is authorized to import the adjusted value or state of each said at least one control parameter defining the given user-configured subsystem control mode.

12. A control system according to claim 1 wherein the control modes comprise at least one control mode adapted for driving on a driving surface of relatively low surface coefficient of friction.

13. A control system according to claim 1 wherein said at least one subsystem comprises a powertrain subsystem, a brakes subsystem or a suspension subsystem.

14. A control system according to claim 1 comprising an electronic processor having an electrical input for receiving a signal from the input means for permitting the user to provide the input to the control system, and an electronic memory device electrically coupled to the electronic processor and having instructions stored therein,
wherein the processor is configured to access the memory device and execute the instructions stored therein such that it is operable to allow the user to adjust, via the input means, the value or state of the at least one of said at least one control parameters of at least one of the plurality of subsystems to customize operation of the vehicle.

15. A vehicle comprising a control system according to claim 1.

16. A control system according to claim 1 wherein the baseline subsystem control modes comprise at least one control mode adapted for driving on at least one of a snowy surface, an icy surface, grass, gravel, snow, mud and sand.

17. A method of controlling at least one subsystem of a vehicle by means of a control system, the method comprising:
initiating control of the or each of the at least one vehicle subsystem in one of a plurality of baseline subsystem control modes by setting at least one control parameter of the or each of the at least one subsystem to a predetermined, stored, value or state applicable to that baseline subsystem control mode, each baseline subsystem control mode corresponding to one or more different terrain types for the vehicle, and two or more of the plurality of baseline subsystem control modes being configurable by a user; and
receiving by means of input means a user input to the control system,
the method further comprising, for a first user-configurable baseline control mode of the two or more user-configurable baseline subsystem control modes, allowing the user to define, via the input means, a user-configured subsystem control mode based on said first user-configurable baseline subsystem control mode by adjusting the value or state of at least one of said at least one control parameter to a value or state other than the predetermined stored value or state applicable to the first user-configurable baseline subsystem control mode, wherein an allowable range of values or states of said at least one control parameter is dependent at least in part on the identity of the first user-configurable baseline subsystem control mode in respect of which the value or state of at least one control parameter is to be adjusted, and further wherein the allowable range of values or states of said at least one control parameter for the first user-configurable baseline subsystem control mode is different than an allowable range of values or states of said at least one control parameter for another one of said two or more user-configurable baseline subsystem control modes, and wherein the method comprises causing the subsystem controller to initiate control of the or each of the at least one vehicle subsystem in the user-configured subsystem control mode.

18. A non-transitory computer readable storage medium carrying a computer readable code for controlling a vehicle to carry out the method according to claim 17.

19. A processor arranged to implement the method of claim 17.

* * * * *